Dec. 5, 1961  K. K. KROFFKE  3,011,753
FLOW CONTROL VALVE
Filed July 8, 1960  2 Sheets-Sheet 1
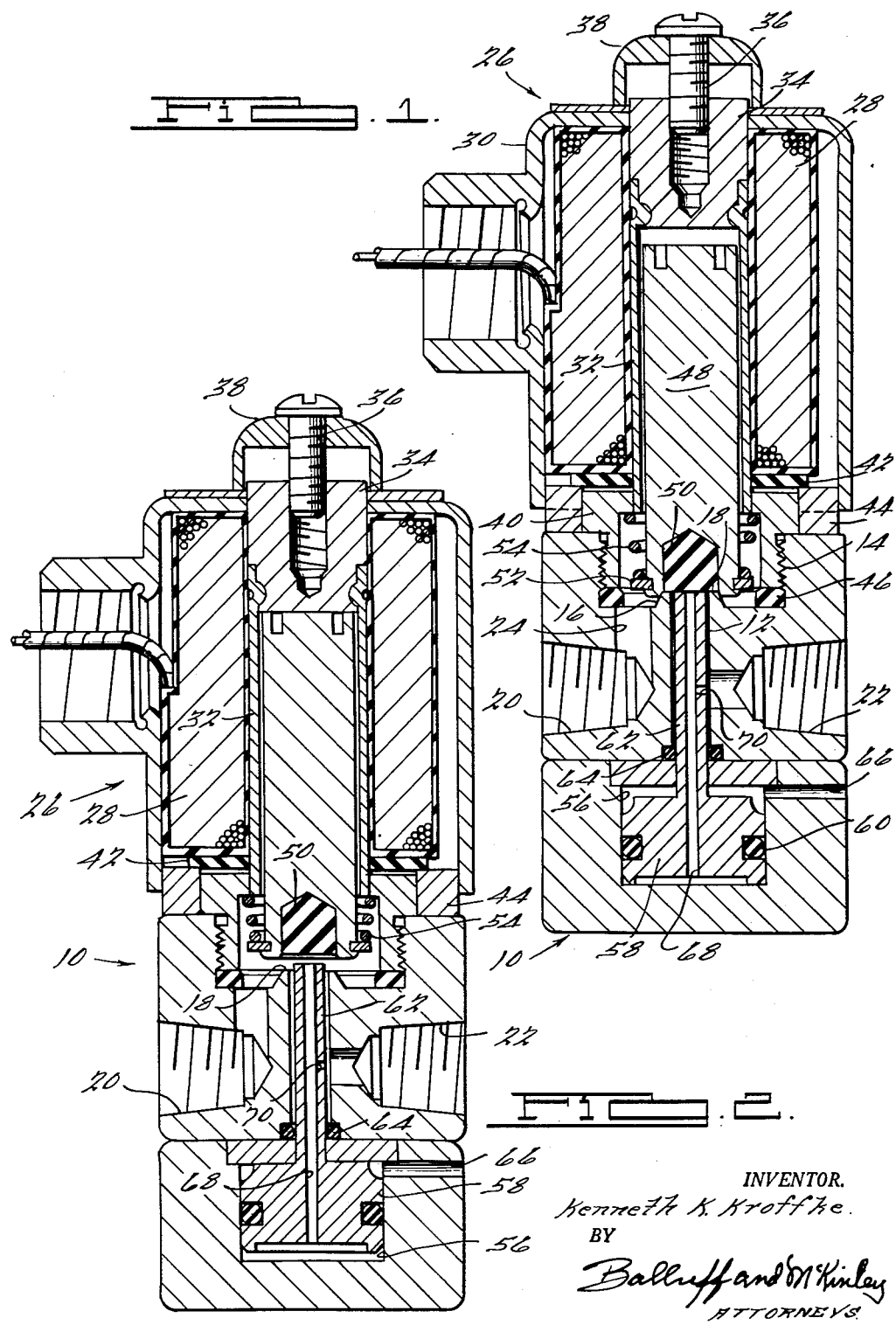
INVENTOR.
Kenneth K. Kroffke
BY
Balluff and McKinley
ATTORNEYS.

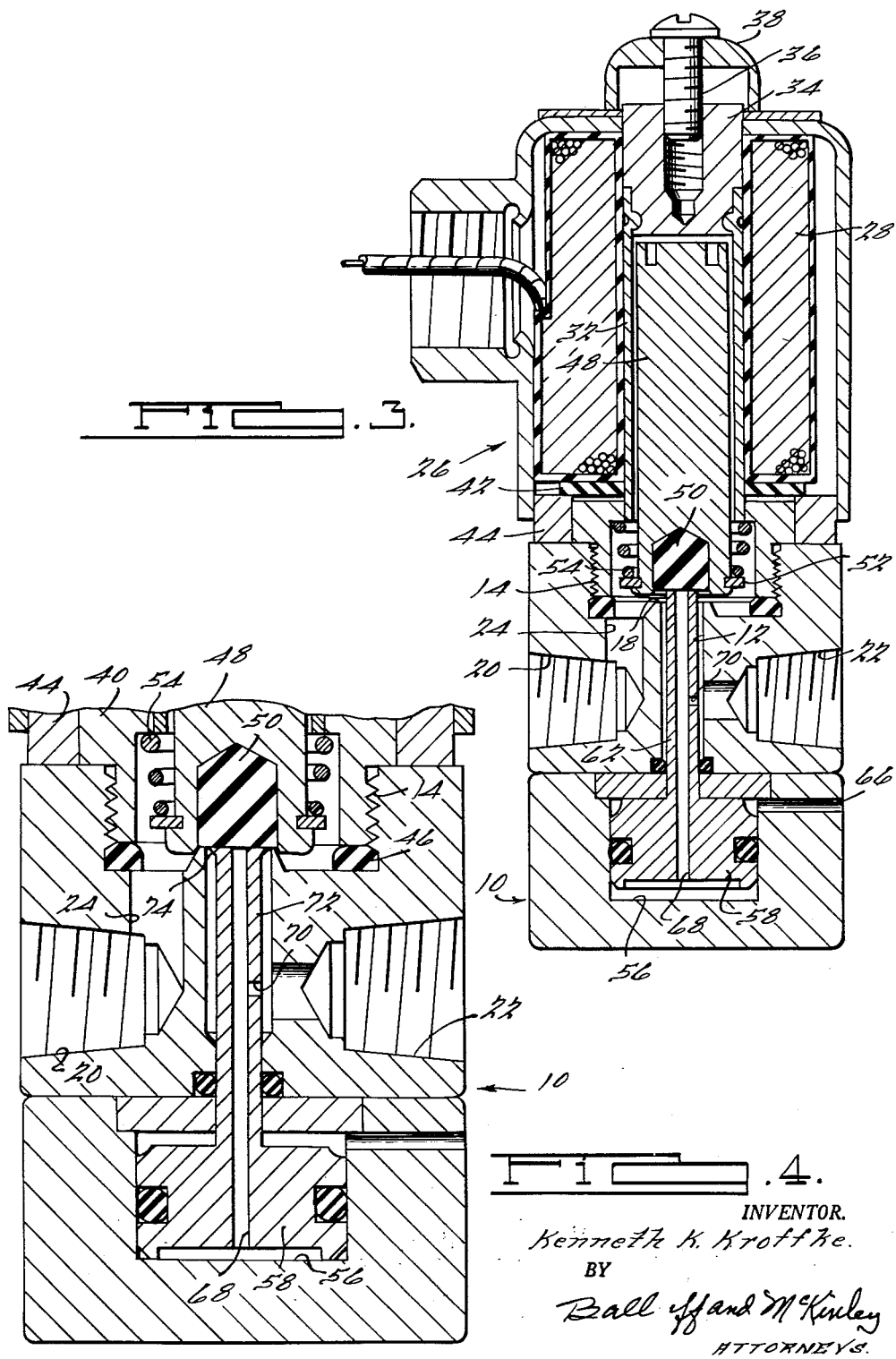

United States Patent Office 3,011,753
Patented Dec. 5, 1961

3,011,753
FLOW CONTROL VALVE
Kenneth K. Kroffke, Parma, Ohio, assignor to Airmatic Valve, Inc., Cleveland, Ohio, a corporation of Ohio
Filed July 8, 1960, Ser. No. 41,553
5 Claims. (Cl. 251—51)

This invention relates to valve structures and has particular reference to a flow control valve which is designed to eliminate shock in the hydraulic system in which the valve is used when the valve is opened and closed. This result is obtained by controlling the rate of opening or closing of the valve, and the resistance to opening and closing may be used as a time delay to effect closing of the valve a predetermined time interval after closing movement of the valve is initiated.

A principal object of the invention is to provide a new and improved flow control valve.

A further object of the invention is to provide a valve of the type described which is designed to control the rate of opening or closing of the valve to eliminate shock in the hydraulic system in which the valve is used.

Another object of the invention is to provide a flow control valve which is designed to obtain timed opening or closing.

Other and further objects of the invention will be apparent from the following description and claims and may be understood by reference to the accompanying drawings, of which there are two sheets, which by way of illustration show preferred embodiments of the invention and what I now consider to be the best mode of applying the principles thereof. Other embodiments of the invention may be used without departing from the scope of the present invention as set forth in the appended claims.

In the drawings:

FIG. 1 is a sectional view through a solenoid operated flow control valve embodying the principles of this invention;

FIGS. 2 and 3 are views similar to FIG. 1 but showing the valve in different positions thereof; and FIG. 4 is a fragmentary sectional view illustrating a modified form of the invention.

The valve shown in FIGS. 1 to 3 comprises a valve body 10 provided with an axial passage 12 terminating at one end in a threaded counterbore 14 and a raised portion 16 which defines a valve seat 18. The valve is provided with an inlet port 20 and an outlet port 22. A passage 24 provides communication between the inlet port 20 and the passage 12, while the exhaust port 22 communicates with the passage 12.

The solenoid 26 is mounted on the valve body 10 and includes a coil 28 within a housing 30. A sleeve 32 is secured to a plug 34 which is threaded to receive a screw 36 projecting through a cap 38 which seats against the housing 30. A collar 40 is threaded into the valve body 10 and is secured to the lower end of the sleeve 32 in any suitable manner. An insulating washer 42 surrounds the sleeve 32 and is engaged by a spacer ring 44 which surrounds the collar 40 and is clamped between the washer 42 and the valve body when the clamping screw 36 is tightened. A seal 46 is provided between the collar 40 and the valve body 10.

The solenoid core 48 is reciprocable within the sleeve 32 and is provided with a recess at its lower end receiving a seal 50 which is adapted to engage the valve seat 18 when the valve is closed. The lower end of the solenoid core 48 is provided with an annular groove receiving a split washer 52. A spring 54 is confined between the retaining washer 52 and an internal shoulder formed on the collar 40 so as to urge the core 48 into sealing engagement with the valve seat when the solenoid is de-energized, as shown in FIG. 1.

The valve body 10 is provided with a cylinder 56 having a pilot piston 58 reciprocable therein. An O ring 60 provides a seal between the piston 58 and cylinder 56. The piston 58 is provided with a stem 62 which extends axially through the passage 12 and is engaged by the seal 50 when the pilot piston is in its lower position with the solenoid de-energized. The annular space around the stem 62 provides a valve orifice which determines the flow rate of the valve. An O-ring 64 provides a seal between the piston stem 62 and the valve body 10. The cylinder 56 is vented by a passage 66.

The piston 58 and stem 62 are provided with an axial bore 68 by means of which the pressure fluid from the inlet 20 is communicated to the cylinder 56 below the piston 58. The stem 62 is provided with a radial bleed orifice 70.

When the solenoid is energized as shown in FIG. 2, the core 48 is retracted against the force of spring 54 so as to disengage the valve seat 18 and the upper end of the piston stem 62. The pressure fluid then flows through the valve orifice defined by the passage 12 to the exhaust port 22. As soon as the solenoid is energized, the pressure fluid is communicated to the cylinder 56 below the piston 58 through the bore 68 in the piston and stem, whereupon the piston 58 moves upwardly so as to be positioned between the valve seat 18 and the sealing surface of the seal 50. When the solenoid is then de-energized, the core 48 will first engage the upper end of the piston stem 62 so as to close the bore 68, as shown in FIG. 3. As the core 48 moves downwardly, it forces the piston 58 down, but the pressure fluid trapped beneath the piston can escape only through the bleed orifice 70 so as to cushion the closing movement of the valve. The size of the bleed orifice 70 determines the rate of closing of the valve so that a predetermined time delay may be obtained between the time that the solenoid is de-energized and the closing of the valve. The resistance to closing of the valve offered by the pilot piston 58 provides a gradual closing of the valve which eliminates shock in the system upon closing of the valve. When the valve is closed the pressure fluid reacts against the upper end of the solenoid core 48 to hold the valve in its closed position.

In the embodiment of the invention illustrated in FIG. 4, the construction is the same as described in connection with FIGS. 1 to 3, except that the piston stem 72 is modified slightly so as to obtain timed opening of the valve as well as timed closing, thereby to eliminate shocks in the hydraulic system when the valve is either opened or closed. In this form of the invention the upper end of the piston stem 72 is tapered outwardly as at 74 so as to define a very small valve orifice between the end of the stem 72 and the upper end of the passage 12 when the valve is in its closed position. When the solenoid is energized the core 48 disengages the valve seat 18 and the stem 72 so as to allow pressure fluid to move the piston 58 upwardly. However, the size of the valve orifice is initially very small and increases in size as the piston moves up so as to obtain a gradual opening of the valve orifice to its full extent. When the solenoid is de-energized, the seal 50 first engages the upper end of the piston stem 72 to close the bore 68. The piston is moved downwardly at a rate which is controlled by the size of the bleed orifice 70 and, as the tapered end 74 of the stem enters the passage 12, the size of the valve orifice is gradually decreased until the seal engages the valve seat 18 to completely close the valve. The tapered end of the piston stem therefore provides timed opening as well as closing of the valve and eliminates shock in the hydraulic system when the valve is opened and closed.

While I have illustrated and described preferred embodiments of my invention, it is understood that these are capable of modification, and I therefore do not wish

I claim:

1. A valve comprising a valve body having an inlet and an outlet and a passage between said inlet and outlet, a valve seat surrounding said passage, a valve member engageable with said valve seat to close said passage, means urging said valve member into engagement with said valve seat, said valve member being movable away from said valve seat to open said passage, a cylinder in said valve body, a piston reciprocable in said cylinder and having a stem extending coaxially through said passage to define an annular valve orifice around said stem, the end surface of said stem being engageable by said valve member, stop means to limit movement of said end surface in one direction to a position between said valve seat and said valve member, a bore extending from said end surface through said stem and piston and through which pressure fluid is supplied to said cylinder upon opening of the valve to position said end of said stem between said valve seat and said valve member, a bleed orifice in said stem communicating said bore with said passage downstream of said valve seat, said valve member upon closing movement thereof being engageable with said end surface of said stem to close said bore before said valve member engages said valve seat whereby the closing of said passage by said valve member is delayed until the pressure fluid trapped in said cylinder escapes through said bleed orifice.

2. A valve according to claim 1 wherein said end of said stem is tapered to progressively increase the size of said valve orifice upon opening of the valve and progressively decrease the size of said valve orifice upon closing of the valve thereby cushioning the opening and closing of the valve.

3. A valve comprising a valve body having an inlet and an outlet and a passage between said inlet and outlet, a valve seat surrounding said passage, a valve member engageable with said valve seat to close said passage, spring means urging said valve member into engagement with said valve seat, said valve member being movable away from said valve seat to open said passage, a cylinder in said valve body, a piston reciprocable in said cylinder and having a stem extending through said passage to define an annular valve orifice around said stem, the end surface of said stem being engageable by said valve member, stop means to limit movement of said end surface in one direction to a position between said valve seat and said valve member, said piston and stem having a bore therethrough extending from said end surface to said cylinder to supply pressure fluid to said cylinder when the valve is open thereby to move said piston in one direction so that said end surface of said stem is positioned between said valve member and said valve seat, a bleed orifice in said stem communicating said bore with said passage downstream of said valve seat, said valve member being engageable with said end surface of said stem upon closing movement of the valve member to close said bore and permit the escape of fluid from said cylinder only through said bleed orifice as said piston is forced in the other direction by said valve member, thereby to regulate the rate of closing of said valve orifice by said valve member.

4. A solenoid operated valve comprising a valve body having an inlet and an outlet and a passage between said inlet and outlet, a valve seat surrounding said passage, a solenoid having a core, a seal carried by said core and engageable with said valve seat to close said passage, spring means urging said core into engagement with said valve seat, said core being movable away from said valve seat to open said passage when the solenoid is energized, a cylinder in said valve body, a piston reciprocable in said cylinder and having a stem extending through said passage to define an annular valve orifice around said stem, stop means to limit movement of said stem in one direction to a position in which the end surface of said stem is disposed between said valve seat and said seal, said piston and stem having a bore therethrough extending from the end surface of said stem to said cylinder to supply pressure fluid to said cylinder when the solenoid is energized thereby to move said piston in one direction so that said end surface of said stem is positioned between said seal and said valve seat, a bleed orifice in said stem communicating said bore with said passage downstream of said valve seat, said seal being engageable with said end surface of said stem before engaging said valve seat upon de-energization of said solenoid to close said bore and permit the escape of fluid from said cylinder only through said bleed orifice as said piston is forced in the other direction by said solenoid core, thereby to regulate the rate of closing of said passage when the solenoid is de-energized.

5. A valve according to claim 4 wherein said stem is provided with a taper adjacent said end surface to vary the size of said valve orifice upon opening of said valve.

References Cited in the file of this patent

UNITED STATES PATENTS 2,667,894     Tower _____ Feb. 2, 1954

FOREIGN PATENTS 544,524     Great Britain _____ Apr. 16, 1942